(12) United States Patent
Nishida et al.

(10) Patent No.: US 11,420,576 B2
(45) Date of Patent: Aug. 23, 2022

(54) VEHICLE BODY LOWER STRUCTURE OF VEHICLE

(71) Applicant: MAZDA MOTOR CORPORATION, Hiroshima (JP)

(72) Inventors: Shuhei Nishida, Hiroshima (JP); Yoshiatsu Kuga, Hiroshima (JP); Toshio Sakamoto, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 162 days.

(21) Appl. No.: 17/045,618

(22) PCT Filed: Apr. 11, 2019

(86) PCT No.: PCT/JP2019/015804
§ 371 (c)(1),
(2) Date: Oct. 6, 2020

(87) PCT Pub. No.: WO2019/203116
PCT Pub. Date: Oct. 24, 2019

(65) Prior Publication Data
US 2021/0170967 A1 Jun. 10, 2021

(30) Foreign Application Priority Data
Apr. 16, 2018 (JP) .............................. JP2018-078192

(51) Int. Cl.
*B60R 19/24* (2006.01)
*B62D 25/18* (2006.01)
*B60R 19/18* (2006.01)

(52) U.S. Cl.
CPC .............. *B60R 19/24* (2013.01); *B62D 25/18* (2013.01); *B60R 2019/1886* (2013.01); *B60R 2019/247* (2013.01)

(58) Field of Classification Search
CPC ............ B60R 19/24; B60R 2019/1886; B60R 2019/247; B62D 25/18
See application file for complete search history.

(56) References Cited

U.S. PATENT DOCUMENTS 4,362,310 A * 12/1982 Goodall ............... B62D 25/188
280/157
8,162,380 B2 * 4/2012 Sumitani ............... B62D 37/02
296/180.1

(Continued)

FOREIGN PATENT DOCUMENTS

| CN | 101003288 A | 7/2007 |
| JP | 3924666 B2 | 6/2007 |

OTHER PUBLICATIONS

International Search Report issued in PCT/JP2019/015804; dated Jun. 11, 2019.

(Continued)

*Primary Examiner* — D Glenn Dayoan
*Assistant Examiner* — Melissa Ann Bonifazi
(74) *Attorney, Agent, or Firm* — Studebaker & Brackett PC

(57) ABSTRACT

It is intended to provide a vehicle body lower structure capable of preventing a backflow component from flowing outside the vehicle from a rear wheel housing at the shortest distance. The vehicle body lower structure of a vehicle comprising a rear wheel housing 12, and a mud guard 71 integrally attached to an inner surface of a rear portion of the rear wheel housing 12, wherein the mud guard 71 has a plate-shaped shielding portion 71b extending from a vehicle width directional inner side of a rear edge of the rear wheel housing 12 toward a front side of the vehicle, and wherein the shielding portion 71b has an up-down directional length extending from a bottom portion of the mud guard 71 to a (Continued)

position above at least a tail pipe 33 whose outlet portion 33*a* is oriented toward a rear surface of a vehicle body adjacent thereto.

6 Claims, 8 Drawing Sheets

(56) References Cited

U.S. PATENT DOCUMENTS

| | | | |
|---|---|---|---|
| 10,633,034 B2* | 4/2020 | Miwa | B60K 11/08 |
| 2007/0182207 A1 | 8/2007 | Nakaya | |
| 2011/0214568 A1* | 9/2011 | Krantz | F16D 65/0031 |
| | | | 55/385.3 |

OTHER PUBLICATIONS

International Preliminary Report On Patentability and Written Opinion issued in PCT/JP2019/015804; dated September Oct. 20, 2020.
An Office Action mailed by The State Intellectual Property Office of People's Republic of China dated Mar. 3, 2022, which corresponds to Chinese Patent Application No. 201980026241.4 and is related to U.S. Appl. No. 17/045,618.

* cited by examiner

12··· rear wheel housing
14··· rear bumper face

12···rear wheel housing
14···rear bumper face
14A···recess
14B···underneath flow straightening portion 33···tail pipe
33a···outlet portion
71···rear mud guard
71b···shielding portion 71···rear mud guard
71b···shielding portion
71c···bottom portion

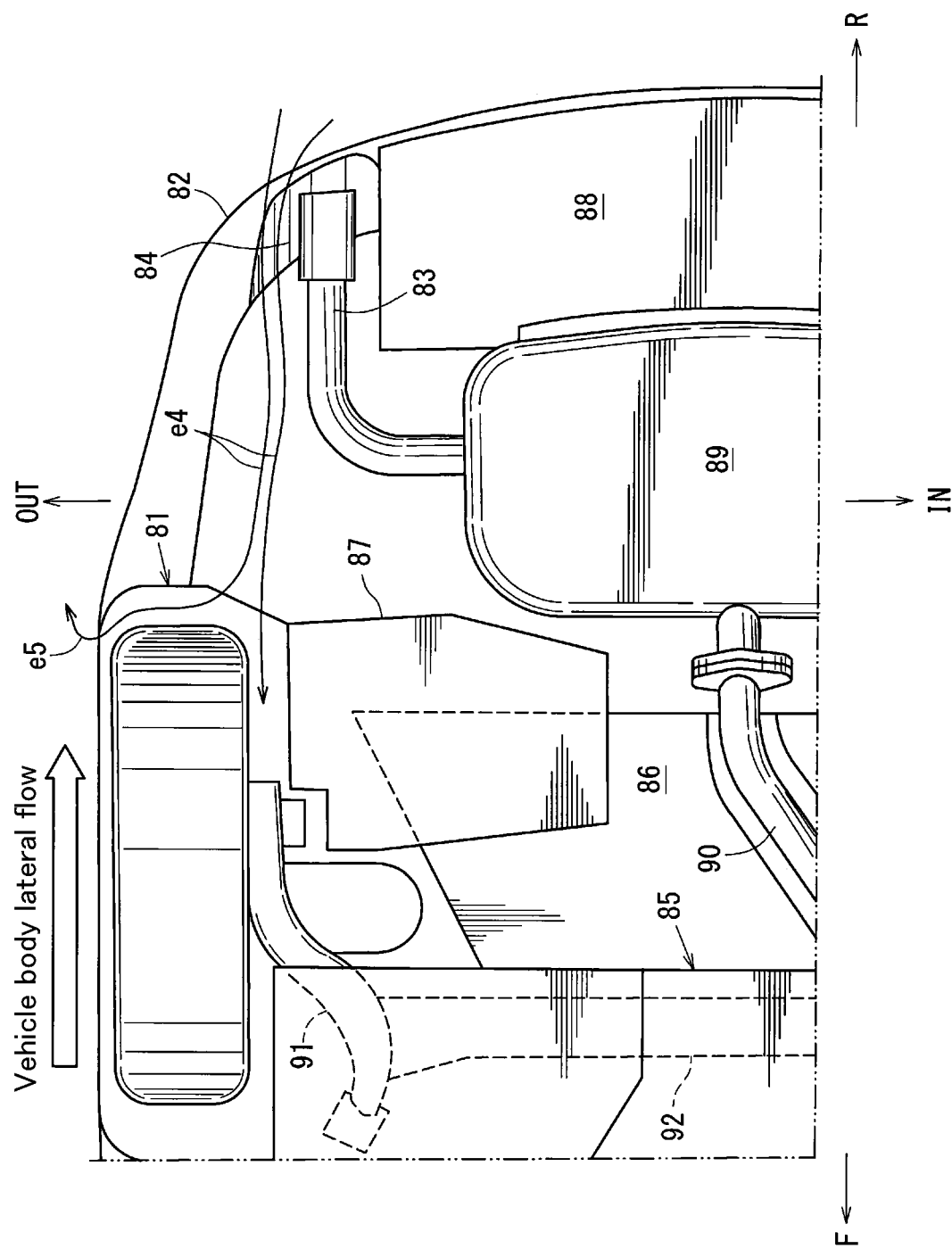

VEHICLE BODY LOWER STRUCTURE OF VEHICLE

TECHNICAL FIELD

The present invention relates to a vehicle body lower structure of a vehicle, comprising a rear wheel housing, and a mud guard attached to an inner surface of a rear portion of the rear wheel housing.

BACKGROUND ART

In recent years, a structure configured to cover the inside of a rear wheel housing by a mud guard, in the same manner as that for the inside of a front wheel housing, has become common. Such a mud guard is utilized to design a structure for controlling air flow in the rear wheel housing, e.g., such that the flow of air to be sucked from the inside of the rear wheel housing toward he outside (i.e., air flow flowing from the inside of the rear wheel arch toward a lateral surface of a vehicle body) due to a vehicle body lateral flow flowing along the vehicle body lateral surface at a relatively high flow rate, is reduced as much as possible.

As a result of various experiments, the present inventors have found that, when the inside of the rear wheel housing 81 becomes a relatively low pressure during traveling of a vehicle (e.g., during traveling at a speed of 60 km/h or more), air flows back from a rear surface of a vehicle body toward a front end of the vehicle via a gap 84 between a rear bumper face 82 and a tail pipe 83, and flows inside the rear wheel housing 81, as indicated by the arrowed line e4 in FIG. 8, and then the air flowing inside the rear wheel housing 81 is sucked out by a vehicle body lateral flow having a high flow rate, whereby the backflow air e4 from the rear bumper face 82 is sucked out from the rear wheel arch (81) at the shortest distance, thereby flowing outside the vehicle as a shortcut e5. Further, the present inventors also have found that the presence of such an airflow component is a factor that actual airflow in the rear wheel housing 81 does not conform to analysis.

In FIG. 8, the reference signs 85 and 86 denote, respectively, a center rear-side undercover, and a rear center undercover, and the reference signs 87 and 88 denote, respectively, a rear lateral undercover, and a rear undercover. The reference signs 89 and 90 denote, respectively, a silencer and an exhaust pipe, and the reference signs 91 and 92 denote, respectively, a trailing arm and a torsion beam.

Meanwhile, in the following Patent Document 1, there is disclosed a structure in which a rear wheel mud guard is attached to a rear bumper face. However, the technical problem of blocking airflow which would otherwise flow outside a vehicle from a rear wheel arch at the shortest distance due to the aforementioned backflow of air is not disclosed in the Patent Document 1.

CITATION LIST

Parent Document

Patent Document 1: JP 3924666B

SUMMARY OF INVENTION

Technical Problem

It is therefore an object of the present invention to provide a vehicle body lower structure of a vehicle, which is capable of preventing a situation where a backflow component of air from a rear end of a vehicle body flows outside the vehicle from a rear wheel arch at the shortest distance.

Solution to Technical Problem

In order to achieve the above object, the present invention provides a vehicle body lower structure of a vehicle, comprising a rear wheel housing, a mud guard attached to an inner surface of a rear portion of the rear wheel housing, a rear bumper face provided at a rear end of a vehicle body of the vehicle, and a tail pipe having at least a portion extending toward a rear side in a vehicle front-rear direction to discharge exhaust gas from the rear end of the vehicle body, wherein the mud guard has a plate-shaped shielding portion extending from a vehicle width directional inner side of a rear edge of the rear wheel housing toward a front side of the vehicle, and wherein, as compared, in a height direction of the vehicle body, to a portion of the tail pipe extending toward the rear side in the vehicle front-rear direction, the shielding portion extends from a height position below at least the portion of the tail pipe to a height position above at least the portion of the tail pipe.

In the vehicle body lower structure of the present invention having the above feature, the shielding portion extends from a vehicle width directional inner side of a rear edge of the rear wheel housing toward a front side of the vehicle, wherein, as compared, in a height direction of the vehicle body, to a portion of the tail pipe extending toward the rear side in the vehicle front-rear direction, the shielding portion extends from a height position below at least the portion of the tail pipe to a height position above at least the portion of the tail pipe. This shielding portion makes it possible to prevent a situation where a backflow component of air from the rear end of the vehicle body flows outside the vehicle from the rear wheel housing at the shortest distance.

Preferably, in the vehicle body lower structure of the present invention, the shielding portion of the mud guard extends upwardly from a bottom portion of the mud guard, wherein the height position of the shielding portion below at least the portion of the tail pipe extending toward the rear side in the vehicle front-rear direction is at a position of the bottom portion of the mud guard.

According to this feature, it is possible to more reliably prevent the situation where the backflow component of air flows outside the vehicle from the rear wheel housing at the shortest distance.

Preferably, in the vehicle body lower structure of the present invention, the shielding portion of the mud guard extends from the vehicle width directional inner side of the rear edge of the rear wheel housing toward the front side of the vehicle, while extending toward the vehicle width directional inner side to divert, from the rear wheel housing, backflow air from the rear end of the vehicle body.

According to this feature, it is possible to more reliably prevent the situation where the backflow component of air flows outside the vehicle from the rear wheel housing at the shortest distance.

Preferably, in the vehicle body lower structure of the present invention, the mud guard has an arch-shaped portion with a surface opposed to a rear portion of a rear wheel housed in the rear wheel housing, wherein the shielding portion of the mud guard extends from a vehicle width directional inner side of the arch-shaped portion toward the front side of the vehicle.

According to this feature, it is possible to more reliably prevent the situation where the backflow component of air from the rear end of the vehicle body flows outside the vehicle from the rear wheel housing at the shortest distance.

Preferably, in the vehicle body lower structure of the present invention, the tail pipe has an outlet portion located at a position of the rear bumper face to discharge exhaust gas to an outside of the vehicle, wherein: the rear bumper face has a recess or opening formed at a position offset in the vehicle width detection to house the outlet portion of the tail pipe with a given gap therebetween; and the shielding portion is provided in a mud guard of a rear wheel housing on a side of the recess or opening formed in the rear bumper face.

According to this feature, it is possible to more reliably prevent the situation where the backflow component of air flows outside the vehicle from the rear wheel housing at the shortest distance, even if the air vigorously flows back from a relatively narrow gap between the outlet portion of the tail pipe and the recess or opening of the rear bumper face.

Preferably, the vehicle body lower structure of the present invention further comprises a plate-shaped underneath flow straightening portion provided rearward of the rear wheel housing to extend from a lower end of the rear bumper face toward a front side in the vehicle front-rear direction, wherein the mud guard has a plate-shaped bottom portion covering a region between a rear end of the rear wheel housing and a front end of the underneath flow straightening portion.

According to this feature, it is possible to straighten the flow of underfloor vehicle traveling wind flowing rearward of the rear wheel housing by the underneath flow straightening portion of the rear bumper face and the bottom portion of the mud guard, and improve rigidity of the mud guard itself by the bottom portion of the mud guard.

Effect of Invention

The present invention can prevent the situation where the backflow component of air from the rear end of the vehicle body flows outside the vehicle from the rear wheel housing at the shortest distance.

BRIEF DESCRIPTION OF DRAWINGS

FIG. 8 is a fragmentary enlarged bottom view showing a vehicle body lower structure of a vehicle as a conventional example, together with a backflow component of air from a rear bumper face.

DESCRIPTION OF EMBODIMENTS

With reference to the accompanying drawings, an embodiment of the present invention will now be described.

Figure 1:
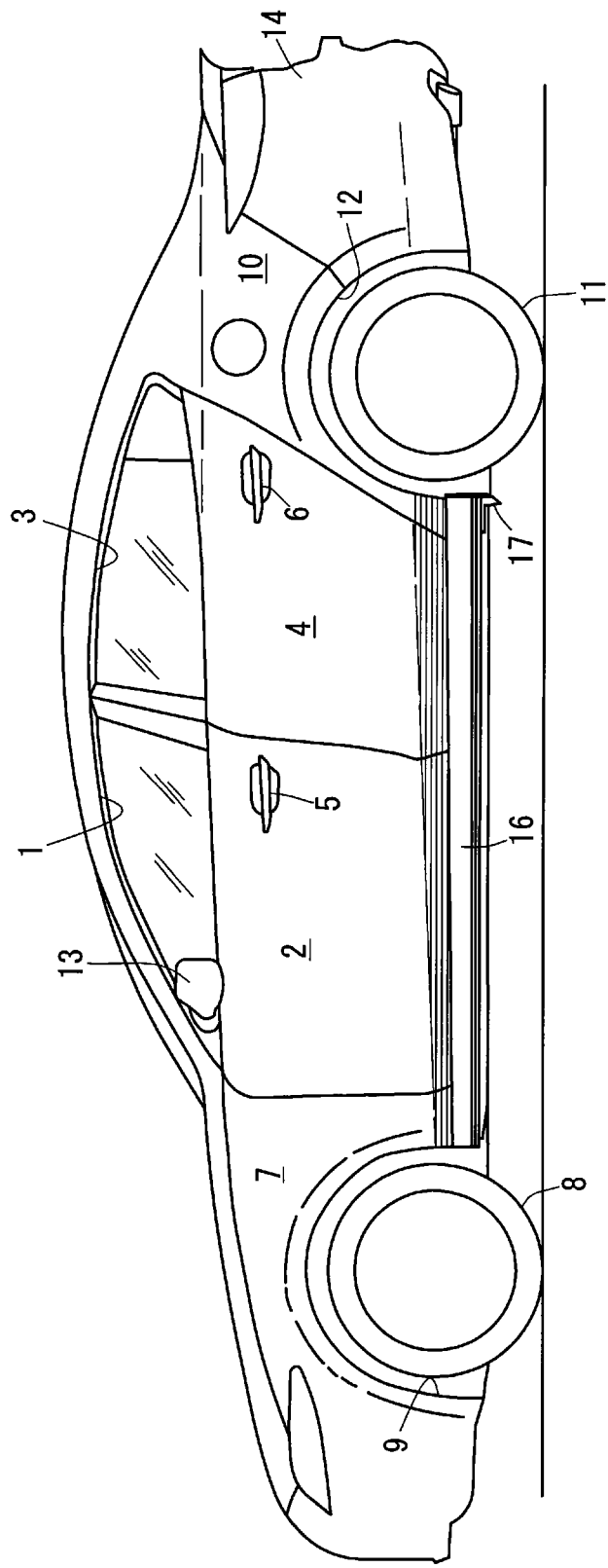
FIG. 1 is a side view of a vehicle having a vehicle body lower structure of a vehicle, according to one embodiment of the present invention.
Figure 2:
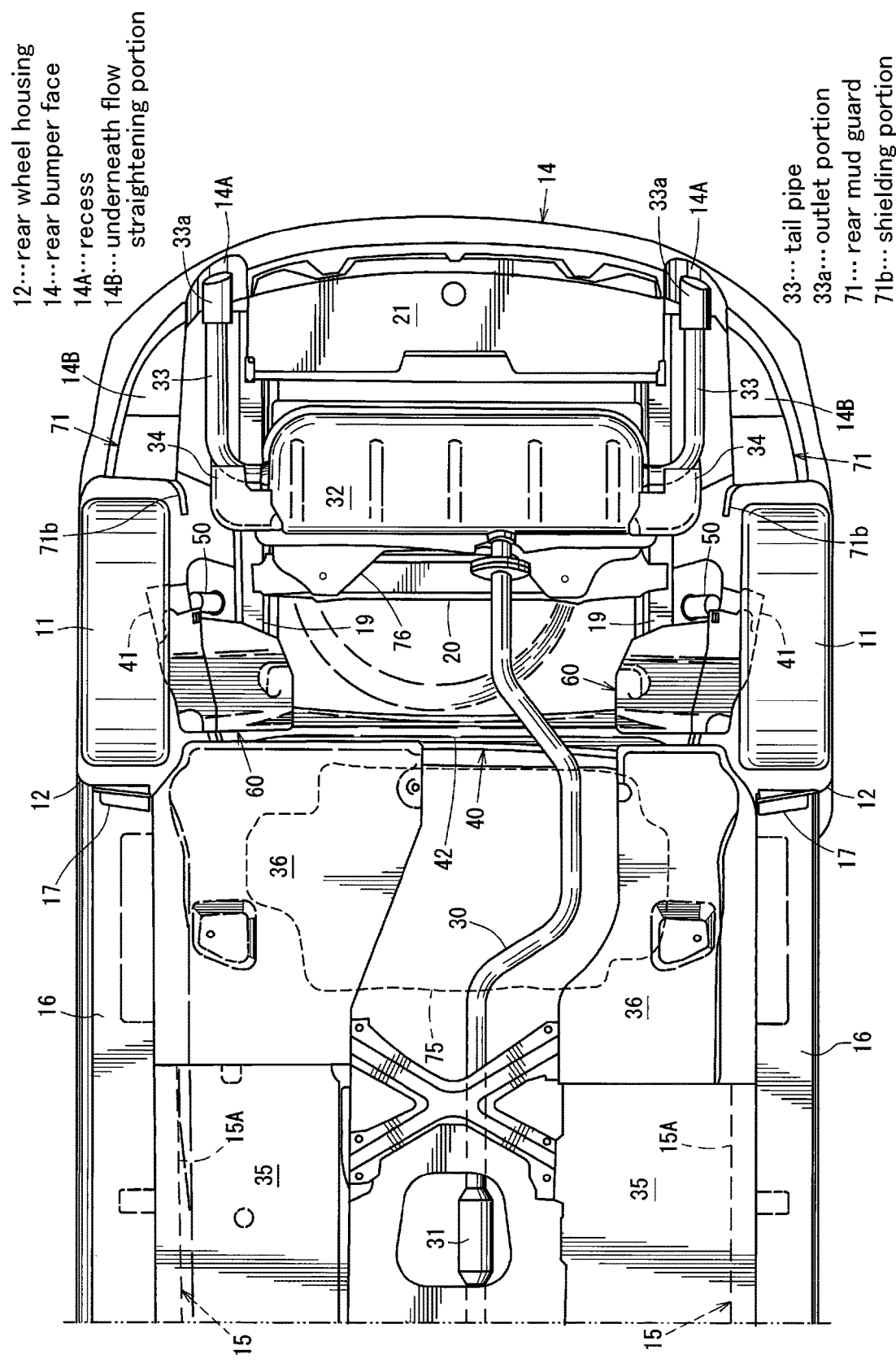
FIG. 2 is a bottom view showing the vehicle body lower structure according to this embodiment, in a rear end portion of the vehicle.
Figure 3:
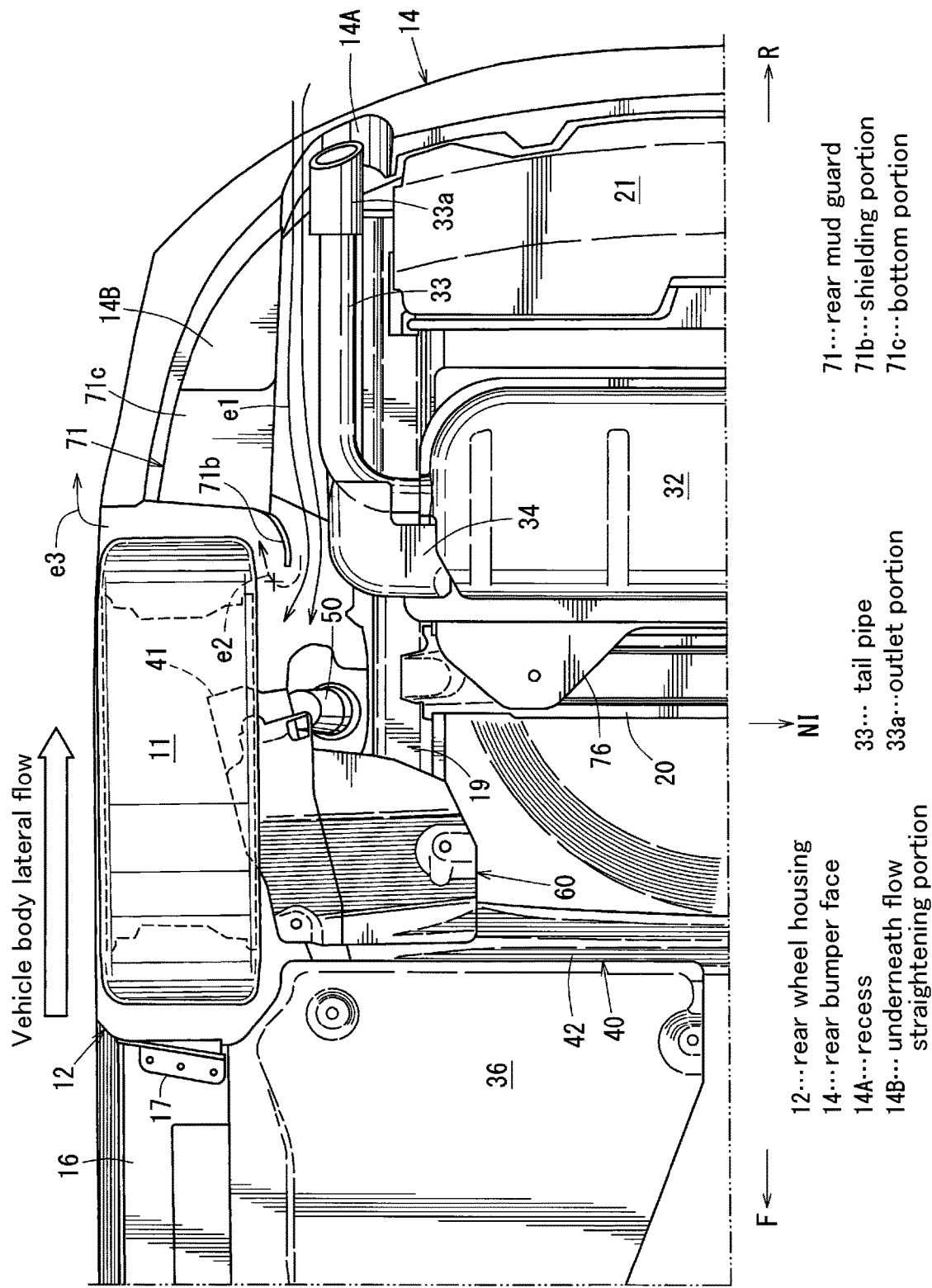
FIG. 3 is a fragmentary enlarged bottom view showing the structure of a rear left wheel-side portion of the vehicle body lower structure illustrated in FIG. 2, together with a backflow component of air from a rear bumper face.
Figure 4:
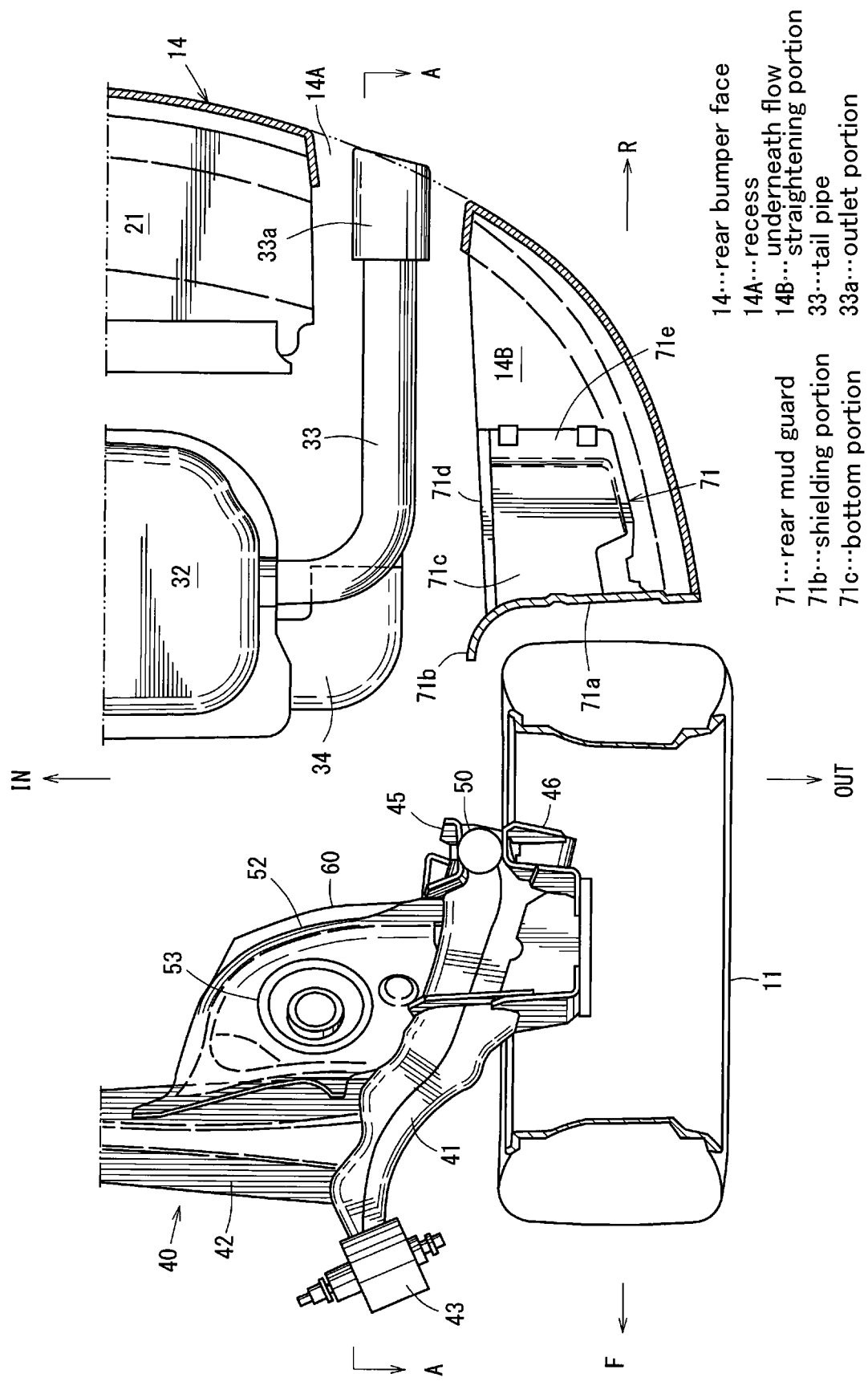
FIG. 4 is a partially-sectional top plan view showing the structure of the rear left wheel-side portion of the vehicle body lower structure according to this embodiment.
Figure 5:
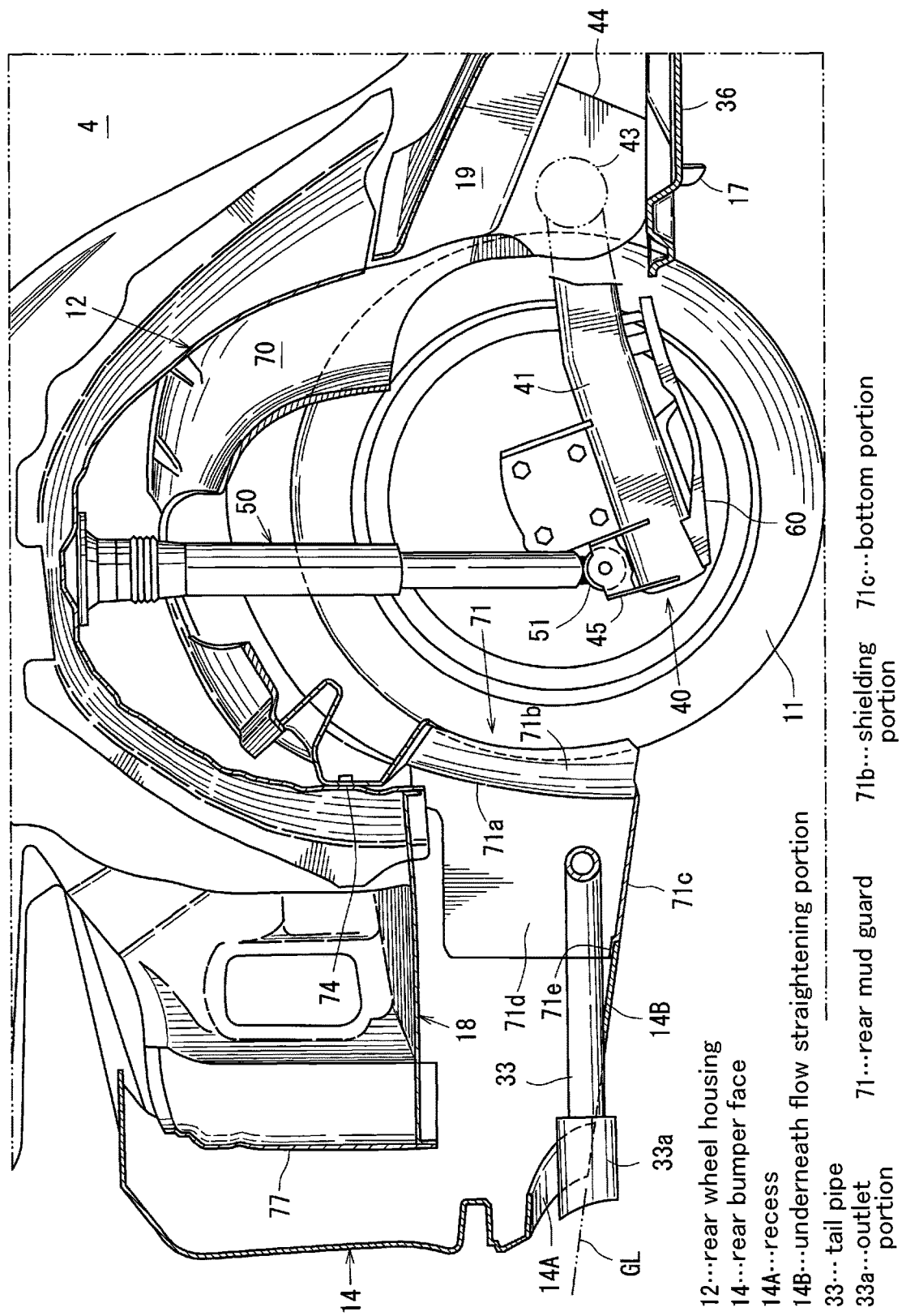
FIG. 5 is a sectional view of the rear left wheel-side portion, taken along the line A-A in FIG. 4.
Figure 6:
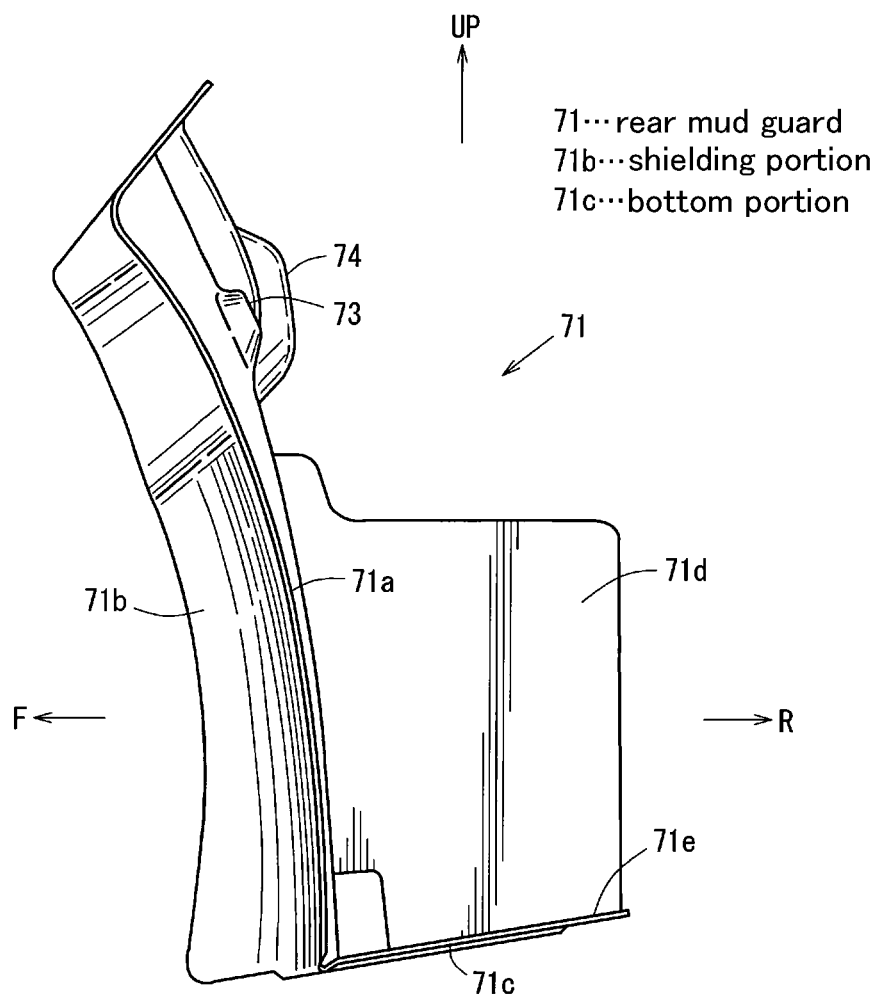
FIG. 6 is a side view of a mud guard to be attached to a rear wheel housing in the vehicle body lower structure according to this embodiment.
Figure 7:
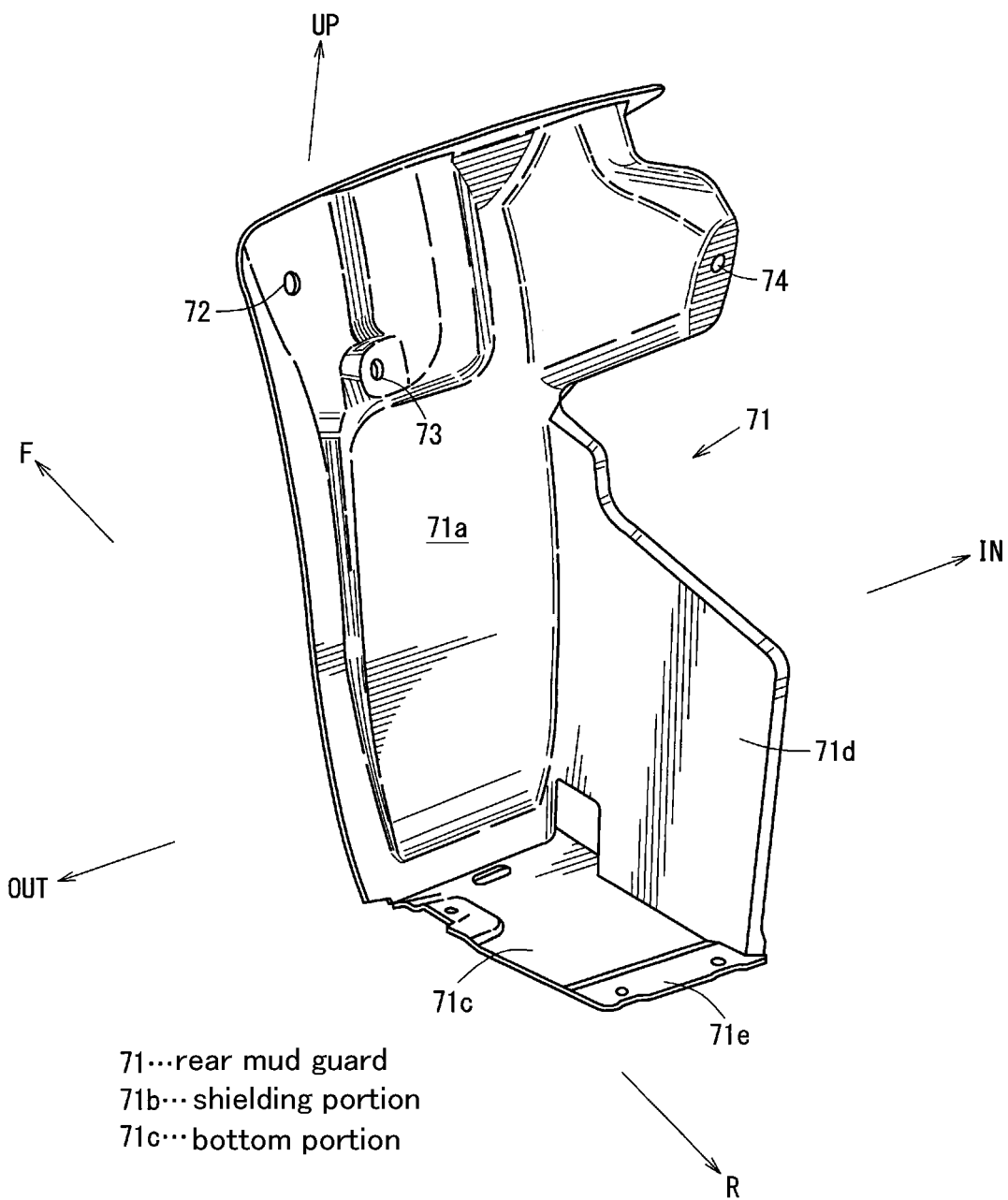
FIG. 7 is a perspective view of the mud guard to be attached to the rear wheel housing in the vehicle body lower structure according to this embodiment.

FIG. 1 is a side view of a vehicle having a vehicle body lower structure of a vehicle, according to one embodiment of the present invention. FIG. 2 is a bottom view showing the vehicle body lower structure according to this embodiment, in a rear end portion of the vehicle. FIG. 3 is a fragmentary enlarged bottom view showing the structure of a rear left wheel-side portion of the vehicle body lower structure illustrated in FIG. 2, together with a backflow component of air from a rear bumper face. FIG. 4 is a partially-sectional top plan view showing the structure of the rear left wheel-side portion of the vehicle body lower structure according to this embodiment. FIG. 5 is a sectional view of the rear left wheel-side portion, taken along the line A-A in FIG. 4. FIG. 6 is a side view of a mud guard to be attached to a rear wheel housing in the vehicle body lower structure according to this embodiment. FIG. 7 is a perspective view of the mud guard to be attached to the rear wheel housing in the vehicle body lower structure according to this embodiment.

As shown in FIG. 1, each of opposite lateral portions of a vehicle body of a vehicle is provided with: a front door 2 as a side door configured to openably and closably close a front door opening 1 on the side of a front end of the vehicle; and a rear door 4 as a side door configured to openably and closably close a rear door opening 3 on the side of a rear end of the vehicle.

The front door 2 is equipped with a door outer handle 5. Similarly, the rear door 4 is equipped with a door outer handle 6.

A front fender panel 7 covering a lateral side of an engine compartment is provided forward of the front door 2, and a front wheel housing 9 is integrally provided along a lower end of the front fender panel 7, correspondingly to the position of a corresponding one of two front wheels 8.

A rear fender panel 10 covering a lateral side of a luggage compartment is provided rearward of the rear door 4, and a rear wheel housing 12 is integrally provided along a lower end of the rear fender panel 10, correspondingly to the position of a corresponding one of two rear wheels 11.

In the figures, the reference sign 13 denotes a door mirror, and the reference sign 14 denotes a rear bumper face formed to extend from the rear end of the vehicle to wrap around right and left lateral portions of the vehicle.

Next, as shown in FIG. 2, a side sill 15 is provided between a lower end of a rear edge of each of the front wheel housings 9 and a lower end of a front edge of a corresponding one of the rear wheel housings (rear wheel arches) 12, to extend along the bottom of a passenger compartment in a vehicle front-rear (longitudinal) direction.

This side sill 15 is a vehicle body strength member having a closed cross-section formed by joining and fixing a side sill outer panel and a side sill inner panel 15A together to extend in the vehicle front-rear direction.

A garnish 16 (specifically, side sill garnish) is attached to each of the pair of right and left side sills 15 to cover the side sill 15 over the range between the front and rear wheel housings 9, 12.

A tire deflector 17 is provided at a rear end of the garnish 16, in opposed relation to a front portion of the rear wheel 11. This tire deflector 17 is designed to cause a lateral flow flowing along each of the vehicle body lateral portions to be oriented toward outside the vehicle once so as to prevent the lateral flow from entering the inside of the rear wheel housing 12, and then to re-adhere to an outer surface of the tire/wheel.

Here, a floor panel 18 (see FIG. 5) forming the bottom of the passenger compartment and the luggage compartment is provided by continuously forming a front floor panel, a rear seat pan, and a rear floor panel.

The right and left side sills 15 are joined and fixed, respectively, to right and left vehicle width directional ends of the floor panel 18 (see FIG. 5), such that each of them extends from the front floor panel to a longitudinally intermediate portion of the rear seat pan in the vehicle front-rear direction.

Further, a pair of right and left rear side flames 19 are provided to extend from the longitudinally intermediate portion of the rear seat pan to a rear end of the rear floor panel in the vehicle front-rear direction, and a closed cross-section is formed between each of the rear side frames 19 and the floor panel 18 to extend in the vehicle front-rear direction.

A rear cross member 20 is provided forward of the after-mentioned silencer 32 to connect between the pair of right and left rear side flames 19 in the vehicle width direction.

Further, an exhaust pipe 30 for guiding exhaust gas discharged via an exhaust port of an engine and an exhaust manifold toward the rear end of the vehicle is provided in a tunnel area defined underneath the floor panel.

A catalyst converter 31 is inserted in this exhaust pipe 30. A silencer 32 as a muffler is coupled to a rear end of the exhaust pipe 30 extending up to a position rearward of the rear cross member 20. Two tail pipes 33 each extending outwardly in the vehicle width direction once and then extending toward a rear side in the vehicle front-rear direction to have an L shape in bottom view are attached, respectively, to right and left sides of the silencer 32.

A flow straightening cover 34 is disposed to cover a region between a front region of each of width directional opposite outer portions of the silencer 32, and a front corner portion of a corresponding one of the tail pipes 33, from therebelow. Further, a rear undercover 21 having a flat flow-straightening surface is provided rearward of the silencer 32.

Front and rear flow-straightening floor undercovers 35, 36 are provided underneath the vehicle body to cover a lower surface of the vehicle body, except for the tunnel area. Each of the floor undercovers 35, 36 has a flat flow-straightening surface in the bottom thereof.

These floor undercovers 35, 36 are formed such that the front floor undercover 35 becomes continuous with the rear floor undercover 36 in the vehicle front-rear direction.

As a rear suspension, a torsion beam rear suspension 40 (see FIGS. 2, 4 and 5) is provided to suspend the rear wheels 11.

This rear suspension 40 comprises a pair of right and left trailing arms 41 each extending approximately in the vehicle front-rear direction, and a torsion beam 42 (torsion bar spring) extending in the vehicle width direction to couple the trailing arms 41 together.

A front end of each of the trailing arms 41 is pivotally supported by a corresponding one of the rear side frames 19 as the vehicle body, through an arm pivot 43 and an arm bracket 44. Further, a pair of brackets 45, 46 are joined and fixed to a free end, i.e., rear end, of each of the trailing arms 41, and a pivot portion at a lower end 51 of a corresponding one of right and left dampers 50 is pivotally supported by the brackets 45, 46 (see FIGS. 4 and 5).

The damper 50 is mounted between the rear end of the trailing arm 41, and the vehicle body, e.g., an upper end of the rear wheel housing 12.

The torsion beam 42 is formed in an internally hollow closed cross-section structure.

A lower spring seat 52 is attached to a connection corner between the torsion beam 42 and each of the trailing arm 41 by welding means (see FIG. 4).

An upper spring seat (not illustrated) is attached to a lower surface of the rear side frame 19 opposed to the lower spring seat 52 in an up-down direction.

Upper and lower spring retainers are fixed, respectively, to the lower surface of the upper spring seat and an upper surface of the lower spring seat 52, and a coil spring 53 as a suspension spring is disposed to extend between the upper and lower spring retainers.

As shown in FIGS. 2 and 3, each of the floor undercovers 35, 36 is a flow straightening cover provided forward of the rear suspension 40 to cover a lower surface of the vehicle body.

Further, as shown in FIGS. 2 to 5, a plate-shaped arm cover 60 is attached underneath each of the trailing arms 41 to cover the trailing arm 41 in bottom view.

As shown in FIGS. 3 and 5, correspondingly to an outlet portion 33a of the tail pipe 33, a recess 14A is formed in the rear bumper face 14 located at a rear end of the vehicle body, at a position offset in the vehicle width direction to extend in the vehicle front-rear direction to serve as a tail pipe installation space In this embodiment, the rear bumper face 14 is formed of a synthetic resin, and the recess 14A is provided in the rear bumper face 14 at each of a symmetric pair of vehicle width directional offset positions (see FIG. 2).

Further, as shown in FIGS. 2 to 5, a plate-shaped underneath flow straightening portion 14B is formed of a synthetic resin, integrally with a lower end of the rear bumper face14 located rearward of the rear wheel housing 12, to extend from the rear end of the vehicle toward a front side of the vehicle, while wrapping around the right and left lateral portions of the vehicle. In this embodiment, the underneath flow straightening portion 14A is formed in an approximately rectangular triangle whose oblique side is formed in an arc shape, and disposed such that the base of the triangle faces forwardly, and the opposite side faces inwardly in the vehicle width direction.

As shown in FIG. 5, a front mud guard 70 is integrally attached to an inner surface of the rear wheel housing 12 over a range from a vehicle front-rear directional intermediate portion to a front portion of the rear wheel housing 12, and a rear mud guard 71 is integrally attached to an inner surface of a rear portion of the rear wheel housing 12.

As shown in FIGS. 6 and 7, the rear mud guard 71 comprises: an arch-shaped portion 71a along the inner surface of the rear portion of the rear wheel housing 12; a plate-shaped shielding portion 71b extending from a vehicle width directional inner side of a rear edge of the rear wheel housing 12 toward the front side of the vehicle, while protruding in an arc pattern; a plate-shaped bottom portion 71c covering a region between a rear end, i.e., a rear lower end, of the rear wheel housing 12, and the underneath flow straightening portion 14B of the rear bumper face 14; and a connection portion 71d (so-called "vertical wall" connecting the bottom portion 71c and the arch-shaped portion 71a at a vehicle width directional inner end thereof Here, as shown in FIG. 5, a rear end part 71e of the bottom portion 71c of the rear mud guard 71 is attached to a front end of the underneath flow straightening portion 14B of the rear bumper face 14 from above an upper surface of the front end, whereby a lower surface of the bottom portion 71c and a lower surface of the underneath flow straightening portion 14B are formed to be continuous in the vehicle front-rear direction in flush relation with each other.

Further, as shown in FIG. 3, a vehicle width directional inner surface of the connection portion 71d of the rear mud guard 71 and a vehicle width directional inner surface of the underneath flow straightening portion 14B of the rear bumper face 14 are formed to be continuous in the vehicle front-rear direction in flush relation with each other.

Further, as shown in FIG. 7, an upper portion of the arch-shaped portion 71a is formed with a plurality of attaching portions 72, 73, 74 for allowing the rear mud guard 71 to be attached to the rear wheel housing 12 therethrough.

As shown in FIG. 5, a portion of the tail pipe 33 extending rearwardly in the vehicle front-rear direction up to the outlet portion 33a disposed at the rear end of the vehicle body adjacent to the rear mud guard 71 is provided rearward of the shielding portion 71b, as viewed in the vehicle width direction. Then, as shown in FIG. 5, as compared, in a height direction of the vehicle body, to the portion 33 of the tail pipe extending rearwardly in the vehicle front-rear direction, the shielding portion 71b of the rear mud guard 71 has an up-down directional length extending from the bottom, i.e., the bottom portion 71c, of the rear mud guard 71, which is a height position below at least the portion of the tail pipe 33 to a height position above at least the portion of the tail pipe 33.

Further, in this embodiment, as shown in FIG. 5, the shielding portion 71b has an up-down directional length extending from the bottom portion 71c of the rear mud guard 71 to the position of the rear floor panel located above the tail pipe 33.

The rear mud guard 71 is configured to have the above arrangement and shape so as to prevent the situation where, due to the phenomenon that a backflow component (backflow air) e1 illustrated in FIG. 3 is sucked out by a vehicle body lateral flow having a high flow rate, the backflow air flows outside the vehicle from the rear wheel arch at the shortest distance, so-called "shortcut e2". Here, as shown in FIG. 3, most of the shortcut e2 is blocked by the shielding portion 71b, and thereby a flow e3 flowing outside the vehicle from the rear wheel arch is limited to only a small part thereof.

Further, as shown in FIGS. 3 and 5, the shielding portion 71b is provided in the rear mud guard 71 of the rear wheel housing 12 on the side of the outlet portion 33a of the tail pipe 33. In this way, the rear mud guard 71 is configured to cope with airflow vigorously flowing back from a narrow gap between the outlet portion 33a of the tail pipe 33 and a recess or opening (in this embodiment, the recess 14A) of the rear bumper face 14 (to suppress inflow of backflow air into the rear wheel housing 12 and divert the backflow air in a vehicle width directional inward direction).

Further, as shown in FIGS. 3 and 5 to 7, the rear mud guard 71 comprises the plate-shaped bottom portion 71c covering the region between the rear end (rear lower end) of the rear wheel housing 12 and the underneath flow straightening portion 14B of the rear bumper face 14.

In this way, the rear mud guard 71 is configured to straighten the flow of underfloor vehicle traveling wind flowing rearward of the rear wheel housing 12 by both the bottom portion 71c and the underneath flow straightening portion 14B of the rear bumper face 14, and improve rigidity of the mud guard 71 itself by the formation of the bottom portion 71c of the rear mud guard 71.

Here, the bottom portion 71c and the underneath flow straightening portion 14B are arranged along an aerodynamic ground line GL (see FIG. 5) so as to be inclined obliquely upwardly in a rearward direction, i.e., in a front-low and rear-high state in the vehicle front-rear direction, at an inclination angle of about 10 degrees. In this way, the vehicle body lower structure is configured to endure an aerodynamic ground effect of causing the flow of underfloor vehicle traveling wind to flow toward the rear end of a vehicle body to reduce turbulence flow behind the vehicle body.

In this embodiment, the vehicle body lower structure has been mainly based on a left structure, particularly, a rear left wheel-side portion, of the vehicle. However, it should be noted that a right structure of the vehicle is formed bilaterally symmetrically or approximately bilaterally symmetrically with respect to the left structure of the vehicle. In this specification, description of the right structure of the vehicle similar or identical to the left structure of the vehicle will be omitted.

In FIG. 2, the reference sign 75 denotes a fuel tank. In FIGS. 2 and 3, the reference sign 76 denotes a heat damage-preventing insulator provided above the silencer 31. In FIG. 5, the reference sign 77 denotes a rear end panel.

Further, in the figures, the arrowed line F and the arrowed line R indicate, respectively, the front side of the vehicle and the rear side of the vehicle, and the arrowed line IN and the arrowed line OUT indicate, respectively, the vehicle width directional inner side and the vehicle width directional outer side. The arrowed line UP indicates the upside of the vehicle.

As mentioned above, a vehicle body lower structure of a vehicle according to this embodiment comprises a rear wheel housing 12, a mud guard 71 attached to an inner surface of a rear portion of the rear wheel housing 12, a rear bumper face 14 provided at a rear end of a vehicle body of the vehicle, and a tail pipe 33 having at least a portion extending toward a rear side in a vehicle front-rear direction to discharge exhaust gas from the rear end of the vehicle body, wherein the mud guard 71 has a plate-shaped shielding portion 71b extending from a vehicle width directional inner side of a rear edge of the rear wheel housing 12 toward a front side of the vehicle, and wherein, as compared, in a height direction of the vehicle body, to a portion 33 of the tail pipe extending toward the rear side in the vehicle front-rear direction, the shielding portion 71b extends from a height position below at least the portion of the tail pipe to a height position above at least the portion of the tail pipe.

In the vehicle body lower structure according to this embodiment having the above feature, the shielding portion 71b extends from a vehicle width directional inner side of a rear edge of the rear wheel housing 12 toward a front side of the vehicle, wherein, as compared, in a height direction of the vehicle body, to a portion 33 of the tail pipe extending toward the rear side in the vehicle front-rear direction, the shielding portion 71b extends from a height position below at least the portion of the tail pipe to a height position above at least the portion of the tail pipe. This shielding portion makes it possible to prevent a situation where a backflow component of air from the rear end of the vehicle body flows outside the vehicle from the rear wheel housing 12 at the shortest distance.

Further, in the vehicle body lower structure according to this embodiment, the shielding portion 71b has an up-down directional length extending from a bottom portion of the mud guard (bottom portion of the rear mud guard 71) to a position above at least the tail pipe 33 extending up to its outlet portion 33a located at a rear surface of the vehicle body adjacent thereto (see FIGS. 3 and 5). That is, the shielding portion 71b of the mud guard 71 extends upwardly from a bottom portion of the mud guard 71, wherein the height position of the shielding portion 71b below at least the portion 33 of the tail pipe extending toward the rear side in the vehicle front-rear direction is at a position of the bottom portion of the mud guard 71.

According to this feature, the shielding portion 71b extending from the vehicle width directional inner side of the rear edge of the rear wheel housing 12 toward the front side of the vehicle has an up-down directional length extending from the bottom portion of the mud guard to a position above the tail pipe 33, so that it is possible to prevent the situation where the backflow component e1 (see FIG. 3) flows outside the vehicle from the rear wheel housing 12 at the shortest distance, so-called "shortcut e2".

In the vehicle body lower structure according to this embodiment, the shielding portion 71b of the mud guard 71 extends from the vehicle width directional inner side of the rear edge of the rear wheel housing 12 toward the front side of the vehicle, while extending toward the vehicle width directional inner side to divert, from the rear wheel housing, backflow air from the rear end of the vehicle body, so that it is possible to more reliably prevent the situation where the backflow component of air flows outside the vehicle from the rear wheel housing 12 at the shortest distance.

In the vehicle body lower structure according to this embodiment, the mud guard 71 has an arch-shaped portion 71a with a surface opposed to a rear portion of a rear wheel 11 housed in the rear wheel housing 12, wherein the shielding portion 71b of the mud guard 71 extends from a vehicle width directional inner side of the arch-shaped portion 71a toward the front side of the vehicle, so that it is possible to more reliably prevent the situation where the backflow component of air flows outside the vehicle from the rear wheel housing 12 at the shortest distance.

In the vehicle body lower structure according to this embodiment, the rear bumper face 14 located at the rear end of the vehicle body has a recess 14A or opening formed at a position offset in the vehicle width detection, corresponding to the outlet portion 33a of the tail pipe 33, and the shielding portion 71b is provided in a mud guard (rear mud guard 71) on a side of the outlet portion 33a of the tail pipe 33 (see FIG. 3).

That is, in the vehicle body lower structure according to this embodiment, the tail pipe 33 has an outlet portion 33a located at a position of the rear bumper face 14 to discharge exhaust gas to the outside of the vehicle, wherein: the rear bumper face 14 has a recess 14A or opening formed at a position offset in the vehicle width detection to house the outlet portion 33a of the tail pipe 33 with a given gap therebetween; and the shielding portion 71A is provided in a mud guard 71 of a rear wheel housing 12 on the side of the recess 14A or opening formed in the rear bumper face 14.

According to this feature, it is possible to more reliably prevent the situation where the backflow component of air flows outside the vehicle from the rear wheel housing 12 at the shortest distance, even if the air vigorously flows back from a relatively narrow gap between the outlet portion 33a of the tail pipe 33 and the recess 14A or opening of the rear bumper face 14.

In the vehicle body lower structure according to this embodiment, a plate-shaped underneath flow straightening portion 14A is integrally with a lower end of the rear bumper face14 to extend from the rear end of the vehicle toward the front side of the vehicle, while wrapping around the right and left lateral portions of the vehicle, wherein the mud guard (rear mud guard 71) has a plate-shaped bottom portion 71c covering a region between a rear end of the rear wheel housing 12 and the underneath flow straightening portion 14B (see FIGS. 3 and 5).

According to this feature, it is possible to straighten the flow of underfloor vehicle traveling wind flowing rearward of the rear wheel housing 12 by the underneath flow straightening portion 14B of the rear bumper face 14 and the bottom portion 71c of the mud guard (rear mud guard 17), and improve rigidity of the mud guard 71 itself by formation of the bottom portion 71c of the mud guard (rear mud guard 17).

As one example of correspondence between elements of the present invention defined in the appended claims and the configuration of the above embodiment, the mud guard in the appended claims corresponds to the rear mud guard 71 in the above embodiment. However, the present invention is not limited to only the configuration of the above embodiment.

For example, the above embodiment exemplified the structure in which the recess 14A is formed in the rear bumper face 14, correspondingly to the outlet portion 33a of the tail pipe 33, to serve as a tail pipe installation space. However, in place of the recess 14A, the vehicle body lower structure may employ an opening formed in the rear bumper face 14 to serve as a tail pipe installation space.

INDUSTRIAL APPLICABILITY

The present invention is useful in a vehicle body lower structure of a vehicle, comprising a rear wheel housing, and a mud guard attached to an inner surface of a rear portion of the rear wheel housing.

LIST OF REFERENCE SIGNS

12: rear wheel housing
14: rear bumper face
14A: recess
14B: underneath flow straightening portion
33: tail pipe
33a: outlet portion
71: rear mud guard (mud guard)
71a: shielding portion
71c: bottom portion

The invention claimed is:
1. A vehicle body lower structure of a vehicle, comprising:
   a rear wheel housing;
   a mud guard attached to an inner surface of a rear portion of the rear wheel housing;
   a rear bumper face provided at a rear end of a vehicle body of the vehicle; and
   a tail pipe having at least a portion extending toward a rear side in a vehicle front-rear direction to discharge exhaust gas from the rear end of the vehicle body,
   wherein the mud guard has a plate-shaped shielding portion extending from a vehicle width directional inner side of a rear edge of the rear wheel housing toward a front side of the vehicle, and wherein, as compared, in a height direction of the vehicle body, to a portion of the tail pipe extending toward the rear side in the vehicle front-rear direction, the shielding portion extends from a height position below at least the portion of the tail pipe to a height position above at least the portion of the tail pipe.

2. The vehicle body lower structure as recited in claim 1, wherein the shielding portion of the mud guard extends upwardly from a bottom portion of the mud guard, and wherein the height position of the shielding portion below at least the portion of the tail pipe extending toward the rear side in the vehicle front-rear direction is at a position of the bottom portion of the mud guard.

3. The vehicle body lower structure as recited in claim 1, wherein the shielding portion of the mud guard extends from the vehicle width directional inner side of the rear edge of the rear wheel housing toward the front side of the vehicle, while extending toward the vehicle width directional inner side to divert, from the rear wheel housing, backflow air from the rear end of the vehicle body.

4. The vehicle body lower structure as recited in claim 1, wherein the mud guard has an arch-shaped portion with a surface opposed to a rear portion of a rear wheel housed in the rear wheel housing, and wherein the shielding portion of the mud guard extends from a vehicle width directional inner side of the arch-shaped portion toward the front side of the vehicle.

5. The vehicle body lower structure as recited in claim 1, wherein the tail pipe has an outlet portion located at a position of the rear bumper face to discharge exhaust gas to an outside of the vehicle, and wherein:
   the rear bumper face has a recess or opening formed at a positon offset in the vehicle width detection to house the outlet portion of the tail pipe with a given gap therebetween; and
   the shielding portion is provided in a mud guard of a rear wheel housing on a side of the recess or opening formed in the rear bumper face.

6. The vehicle body lower structure as recited in claim 1, which further comprises a plate-shaped underneath flow straightening portion provided rearward of the rear wheel housing to extend from a lower end of the rear bumper face toward a front side in the vehicle front-rear direction, wherein the mud guard has a plate-shaped bottom portion covering a region between a rear end of the rear wheel housing and a front end of the underneath flow straightening portion.

* * * * *